United States Patent [19]
Lippman

[11] 3,802,106
[45] Apr. 9, 1974

[54] MOVIE FILM REEL AND COVER

[75] Inventor: Jordan H. Lippman, Glencoe, Ill.

[73] Assignee: Harwood Mfg. Co., Chicago, Ill.

[22] Filed: May 30, 1972

[21] Appl. No.: 257,847

[52] U.S. Cl. .............................................. 40/309
[51] Int. Cl. .............................................. G09f 3/18
[58] Field of Search ........ 40/309; 242/71.8, 71.8 A, 242/74

[56] References Cited
UNITED STATES PATENTS

| | | | |
|---|---|---|---|
| 3,097,810 | 7/1963 | Kerney | 242/71.8 A |
| 3,349,898 | 10/1967 | Palson et al. | 206/52 F |
| 3,559,324 | 2/1971 | Blair | 40/309 |
| 2,002,609 | 5/1935 | Mygland | 40/309 |
| 3,243,136 | 3/1966 | Bloom | 242/71.8 A X |
| 3,377,034 | 4/1968 | Sampson | 242/74 |
| 2,851,801 | 9/1958 | Jennings | 40/309 |
| 3,189,294 | 6/1965 | Morningstar et al. | 242/71.8 A |
| 3,097,810 | 7/1963 | Kerney | 242/71.8 A |

Primary Examiner—Robert W. Michell
Assistant Examiner—J. H. Wolfe
Attorney, Agent, or Firm—Alter Weiss Whitesel & Laff

[57] ABSTRACT

An all plastic movie film reel has spaced parallel flanges separated by a hub axle. One of the flanges has a label area surrounded by an upstanding wall and a window for exposing film stored on the reel. A cover includes an aperture which may be either captured by the upstanding wall or placed to expose the window and, therefore, the amount of film remaining on the reel. Finally, a radial threading channel in the flange leads to a hub area cavity having a pair of snubber posts therein for anchoring the end of the film.

3 Claims, 7 Drawing Figures

PATENTED APR 9 1974
3,802,106
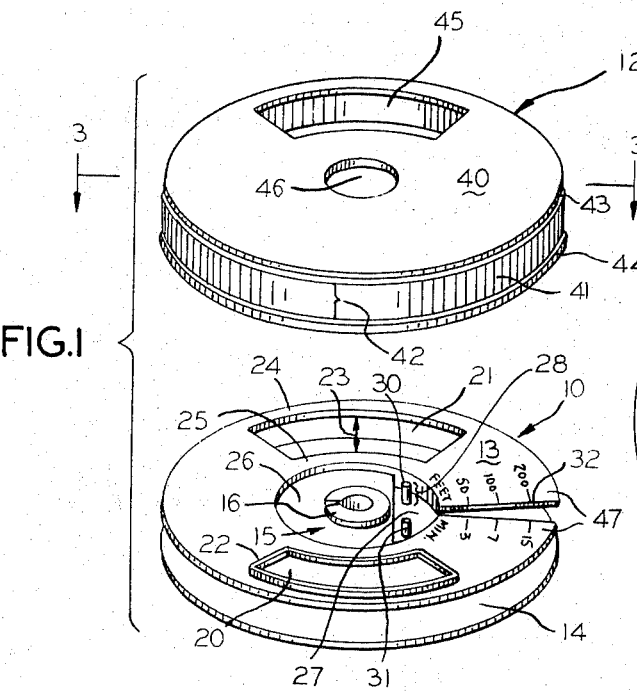
FIG.1
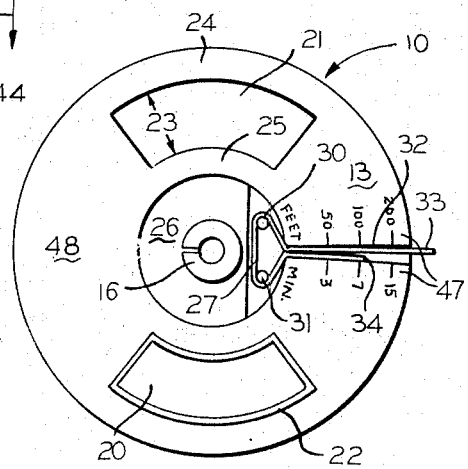
FIG.2
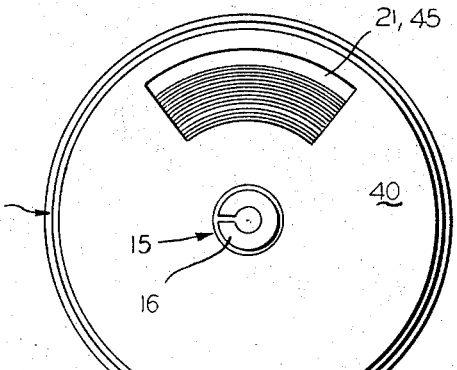
FIG.4
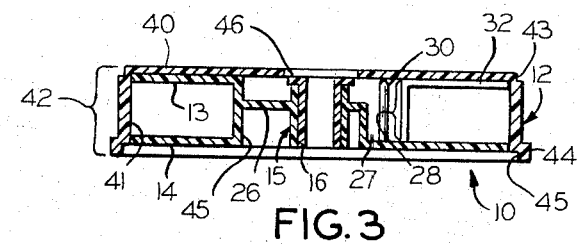
FIG.3
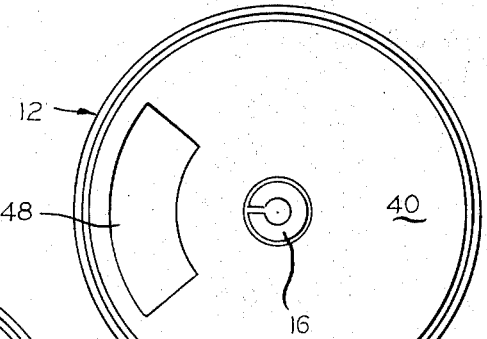
FIG.6
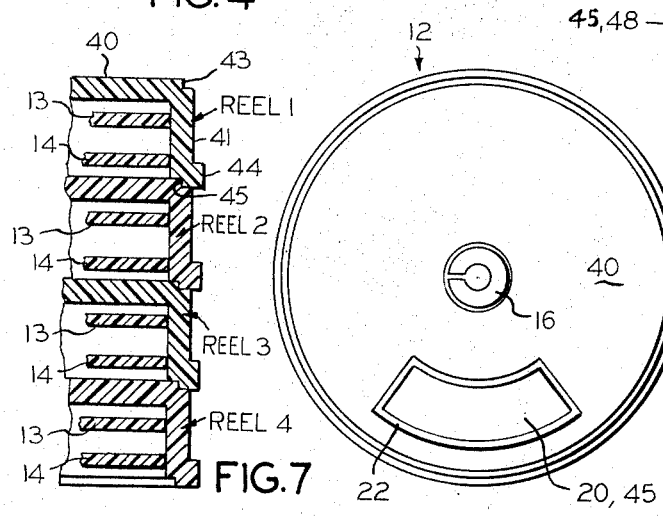
FIG.7
FIG.5

MOVIE FILM REEL AND COVER

This invention relates to reels for motion picture film and, more particularly, although not exclusively, to reels for automatic rewind projectors.

Motion picture film is stored on reels which once were threaded by hand. Therefore, almost any reeling problem could be solved by the person threading the film. Now, projectors operate automatically, and the reel must not present any problems which exceed the capabilities built into the projector.

Beyond the considerations directed to the automatic projector problems, per se, are the convenience and utilitarian considerations which make a better product. For example, a cover is required to preserve the film and to keep it clean. It is convenient to index the stored film by a label written on the cover; however, if the covers of more than one reel are removed at the same time, the covers and reels are often interchanged, and, as a result, the film is falsely marked. Also, in home movies, it is common practice to splice together short lengths of film which are stored on large reels with the result that the larger reels sometimes are only partly filled. It would be convenient for the hobbyist to be able to quickly check among his reels for the unfiled ones which may hold more film. In addition, it is desirable for a projectionist to be able to see the amount of film remaining on a reel so that he may be aware of the approaching end of a presentation.

Accordingly, an object of this invention is to provide new and improved movie film storage reels. Here, an object is to provide reel labeling which can be seen while the reel is covered and yet cannot be changed by switching covers on the reels. Another object is to provide movie film reels which may be inspected quickly and easily, either while covered or uncovered.

Another object is to provide low cost all plastic reels which accomplish the foregoing objects with a minimum of manipulation.

In keeping with an aspect of the invention, these and other objects are accomplished by an all plastic movie film reel which has spaced parallel flanges separated by a hub or axle. One of the flanges has a label area thereon which is surrounded by an upstanding wall. Also, the wall contains a window which is shaped similar to the label area. A cover includes an aperture which may be either captured by the upstanding wall or rotated to expose the window and, therefore, the amount of film remaining on the reel. Finally, a threading channel in the flange leads to a cavity having a pair of snubber posts therein for anchoring the end of the film.

The nature of a preferred embodiment of the invention may be understood best from a study of the attached drawing wherein;

FIG. 1 is a perspective view of the inventive reel and cover;

FIG. 2 is a plan view of the reel showing how the end of the movie film is anchored to a snubber post in a cavity;

FIG. 3 is a cross-sectional view of the assembly comprising the cover and a reel therein, taken along line 3—3 of FIG. 1;

FIG. 4 is a plan view of the cover in place and positioned over the reel with the cover aperture aligned with the flange window to display the film wound on the reel;

FIG. 5 is a similar plan view of the same cover, rotated to display a label area on the enclosed reel;

FIG. 6 is a plan view of the same cover rotated so that neither the film nor the label area is exposed; and FIG. 7 is a cross-section fragment of a plurality of stacked reels.

The invention provides a reel 10 and cover 12 which are held together with a friction fit. Both the reel 10 and the cover 12 are unitary plastic piece parts which may be molded as a unit. The reel comprises upper and lower disk-shaped flanges 13, 14 held in spaced parallel relationship by a plastic hub 15. A nylon or similar bushing 16 fits into the hub to change the diameter of the center hole so that the reel may be used with either a "Super-8" or a "Regular 8" projector.

One of the flanges 13 has two identically shaped areas 20, 21 formed thereon. The area 20 is a label area providing means for displaying indicia of the program content of said film. Area 20 is surrounded by an upstanding wall 22 which projects away from the adjacent flange surface by a distance approximately equal to the thickness of the cover. The area inside the wall 22 may be painted, colored or otherwise treated to receive and display writing, as by a ball point pen, for example. Or, adhesive labels may be stuck to the surface 20 of the flange 13 inside the walled area.

The area 21 is a window cut or otherwise formed in the flange 13. The radial window dimension 23 is preferably a maximum distance commensurate with the mechanical strength required by the reel at the rim section 24 and by the need for mechanically aligning and holding the film as it is wound on the reel.

In the hub 15 area, there is a central platform section 26 and a cavity section 27. The platform 26 is approximately midway between the parallel surfaces formed by the flanges 13, 14. This middle platform position gives approximately equal support to each flange and to the hub 15. The cavity 27 has a depth 28 approximately equal to the width of the film. A pair of snubber posts 30, 31 are integrally molded onto the floor of the cavity formed by one of the flanges 14.

To facilitate loading, a slot 32, formed in the flange 13, extends radially away from the cavity 27. Therefore, to anchor the film to the reel, a loop may be formed by doubling the end back against the film 33. Then the resulting loop may be slipped through the radial slot 32 and over both of the snubber posts 30, 31. When the film 33 is wound on the reel hub 15, the loose film end 34 is held down by the pressure exerted by successive layers wound on the hub. Thereafter, the film wound on the hub tends to take a position set at least to a degree which prevents it from slipping off the snubber posts when all of the film has been payed off the reel during projection.

The film tension increases after the last film has been projected, and while the projector continues to pull against the film which will not slip off the posts 30, 31. A tension sensor detects the increased film tension, and operates a switch to cause a rewind to take place.

The cover 12 may be described as a somewhat disk-shaped member 40 having a circumferential peripheral skirt 41 dependent therefrom. The height 42 of the skirt is approximately equal to the height of the hub and the outside distance between the flanges 13, 14. The flange 14 is an unbroken disk. Therefore, when the reel is captured inside the cover there is a completely closed housing defined on the top and bottom by the cover disk 40 and lower flange 14 and on the sides by the peripheral skirt 41.

On the cover 40 is an indented shoulder wall 43 (FIG. 3), and on the bottom of skirt 41 is an offset capture wall 44, giving a reinforcing strength to the skirt 41. The outside dimensions of the shoulder wall 43 are such that it may be fitted into the curb 45 of the recess formed by capture wall 44 on the bottom of the skirt 41. Therefore, if a plurality of the covered reels are stacked vertically, (FIG. 7) the shoulder walls 43 on the tops of the covers fit against curbs 45 on the insides of the capture wall 44 at the bottom of the reel cover to align, interlock, and stabilize the stack. By way of example FIG. 7 shows fragments of four covered reels which are stacked; however, any suitable number of reels may be so stacked.

Also formed in the cover disk 40 is an aperture 45 having a size, shape, and location corresponding to the size, shape, and location of the label area 20, of the window 21 formed in the flange 13 of the reel 10. A central hole 46 is formed in the cover 40 over the bushing 16.

The manner of using the inventive structure should now be clear from a study of FIGS. 4–6. If, through hole 46, the user holds the bushing 16 between his thumb and a finger of one hand, it is easy to rotate the cover 12 with the other hand. As shown in FIG. 4, rotation may continue until the reel window 21 is aligned with the cover aperture 45. This exposes to view the amount of film stored on the reel 10. A scale 47 may be printed, embossed or otherwise formed on the flange 13 to indicate the amount of film on the reel, both in terms of footage and the time required to show the film.

If the hub 16 is again held and the cover 12 is further rotated, the label area 20 and cover aperture 45 are aligned (FIG. 5). Then, the upstanding wall 22 pops into the aperture 45 to stop easy rotation of the cover. Thereafter, the cover will not inadvertently slip away from the label area. Hence, for storage purposes the reel label is visible and easily readable. If the cover is removed, the label in area 20 stays with the reel. Therefore, it is not possible to mislabel the film by putting an incorrect cover on the reel.

If, for any reason it is desirable to conceal the label from view, it is only necessary to rotate the cover to position the aperture 45 over an intermediate area 48 of the flange 13 which is between reel window 21 and label area 20. Then, (FIG. 6) only the blank portion of the flange 13 may be viewed through the aperture 45.

Although a single embodiment of the invention is shown herewith, various modifications may be made without departing from the invention. Accordingly, the appended claims are to be construed to cover all equivalent structures falling within the scope and spirit of the invention.

I claim:

1. A movie film storage device comprising a reel including two solid flanges held in spaced parallel relationship at a hub area, one of said flanges including window viewing means formed in one of said flanges for displaying the film wound on said reel, lable receiving means on one of said flanges for displaying an indicia of the program content of said film, said lable receiving means on said one flange being surrounded by a protruding upstanding wall, means for facilitating the loading of film on said reel, cover means comprising a disk having viewing means adapted to cooperate with said indicia display to enable said indicia display to be viewed through said cover means, said disk also including a circumferential skirt depending therefrom and projecting beyond the plane of the other of said reel flanges, said skirt being dimensioned to form a friction fit with said flanges, said viewing means including an aperture, said window, aperture, and the outside perimeter of said protruding upstanding wall having substantially the same shape and size whereby said cover may be rotated relative to said reel to display the wound film on said reel through said aperture and window in said flange or upon further rotation to enable said wall to matingly engage with said aperture and fix the position of said cover relative to said reel.

2. The movie film storage device of claim 1 wherein said film loading means comprises a central hub area having a cavity therein with at least one upstanding post and a communicating passageway between said cavity and the area between the spaced parallel flanges, an opening extending longitudinally across the width of said flange to and including said passage, whereby a loop of film may be fitted around the post by slipping it sideways through said longitudinal opening and said passage.

3. The movie film storage device of claim 2 wherein said cavity includes two of said upstanding posts arcuately displaced from each other and positioned the same radial distance from the center axis of the reel.

* * * * *